(12) United States Patent
Kusayama et al.

(10) Patent No.: US 11,333,950 B2
(45) Date of Patent: May 17, 2022

(54) OPTICAL MODULE

(71) Applicant: NTT ELECTRONICS CORPORATION, Yokohama (JP)

(72) Inventors: Atsushi Kusayama, Yokohama (JP); Yasuyuki Nanaumi, Yokohama (JP); Kiyoshi Kido, Yokohama (JP); Yuji Akahori, Yokohama (JP)

(73) Assignee: NTT ELECTRONICS CORPORATION, Kanagawa (JP)

( * ) Notice: Subject to any disclaimer, the term of this patent is extended or adjusted under 35 U.S.C. 154(b) by 0 days.

(21) Appl. No.: 17/295,669

(22) PCT Filed: Aug. 30, 2019

(86) PCT No.: PCT/JP2019/034185
§ 371 (c)(1),
(2) Date: May 20, 2021

(87) PCT Pub. No.: WO2020/110402
PCT Pub. Date: Jun. 4, 2020

(65) Prior Publication Data
US 2022/0019030 A1    Jan. 20, 2022

(30) Foreign Application Priority Data

Nov. 27, 2018   (JP) .............................. JP2018-221319

(51) Int. Cl.
*G02F 1/313* (2006.01)
*G02B 6/35* (2006.01)
(Continued)

(52) U.S. Cl.
CPC ........... *G02F 1/313* (2013.01); *G02B 6/3586* (2013.01); *G02F 1/31* (2013.01); *H04Q 11/0003* (2013.01); *G02B 6/355* (2013.01); *G02F 1/3136* (2013.01)

(58) Field of Classification Search
None
See application file for complete search history.

(56) References Cited

U.S. PATENT DOCUMENTS 5,513,285 A * 4/1996 Kawashima .......... G02F 1/0147
                                                           385/24
5,892,864 A    4/1999 Mueller et al.
(Continued)

FOREIGN PATENT DOCUMENTS

JP     10-505212       5/1998
JP     2004-157332     6/2004
(Continued)

OTHER PUBLICATIONS

International Search Report dated Oct. 15, 2019 in corresponding International PCT Patent Application No. PCT/JP2019/034185, 2 pgs.

*Primary Examiner* — Michael Stahl
(74) *Attorney, Agent, or Firm* — Ohlandt, Greeley, Ruggiero and Perle, LLP (57) ABSTRACT

An optical module of a configuration that ensures use of commercially available electronic components and reduction of the number of current generation circuits and electric wirings. The optical module includes an electronic component mounted on a separate board from a light wave circuit board provided with an optical component such as an optical switch, and they are each electrically connected by wire bonding. For this reason, the optical module can use a commercially available electronic component. In addition, the module has a configuration in which heaters of optical switches, which do not simultaneously flow currents, are grouped and a current from one current generation circuit is supplied to any one of the heaters in the group by means of one electrical switch. For this reason, the optical module (Continued)

does not have to be prepared with the same number of electrical switches and current generation circuits as the number of heaters.

4 Claims, 6 Drawing Sheets

(51) Int. Cl.
*H04Q 11/00* (2006.01)
*G02F 1/31* (2006.01)

(56) References Cited

U.S. PATENT DOCUMENTS

| | | |
|---|---|---|
| 6,389,191 B1 | 5/2002 | Borreman et al. |
| 2004/0086220 A1 | 5/2004 | Takashi et al. |
| 2021/0397065 A1* | 12/2021 | Yanagihara ............ H01R 12/71 |

FOREIGN PATENT DOCUMENTS

| | | | |
|---|---|---|---|
| JP | 2004-177515 | | 6/2004 |
| JP | 2013-12515 A | * | 1/2013 |
| JP | 2016-148753 A | * | 8/2016 |

* cited by examiner

OPTICAL MODULE

BACKGROUND

1. Field of the Disclosure

This disclosure relates to an optical module equipped with a plurality of optical switches that can change routes with electric current.

2. Discussion of the Background Art

There is an optical module that uses a light wave circuit board in which optical switches using a thermooptical effect are integrated. This optical module includes a current generation circuit that controls an optical path by supplying an electric current to a heater formed on the light wave circuit board to heat an optical waveguide for changing a refractive index. The optical module with this configuration has a problem that a large number of current generation circuits and a large number of electrical wires that electrically connect the current generation circuits to the heaters have been required.

Figure 1:
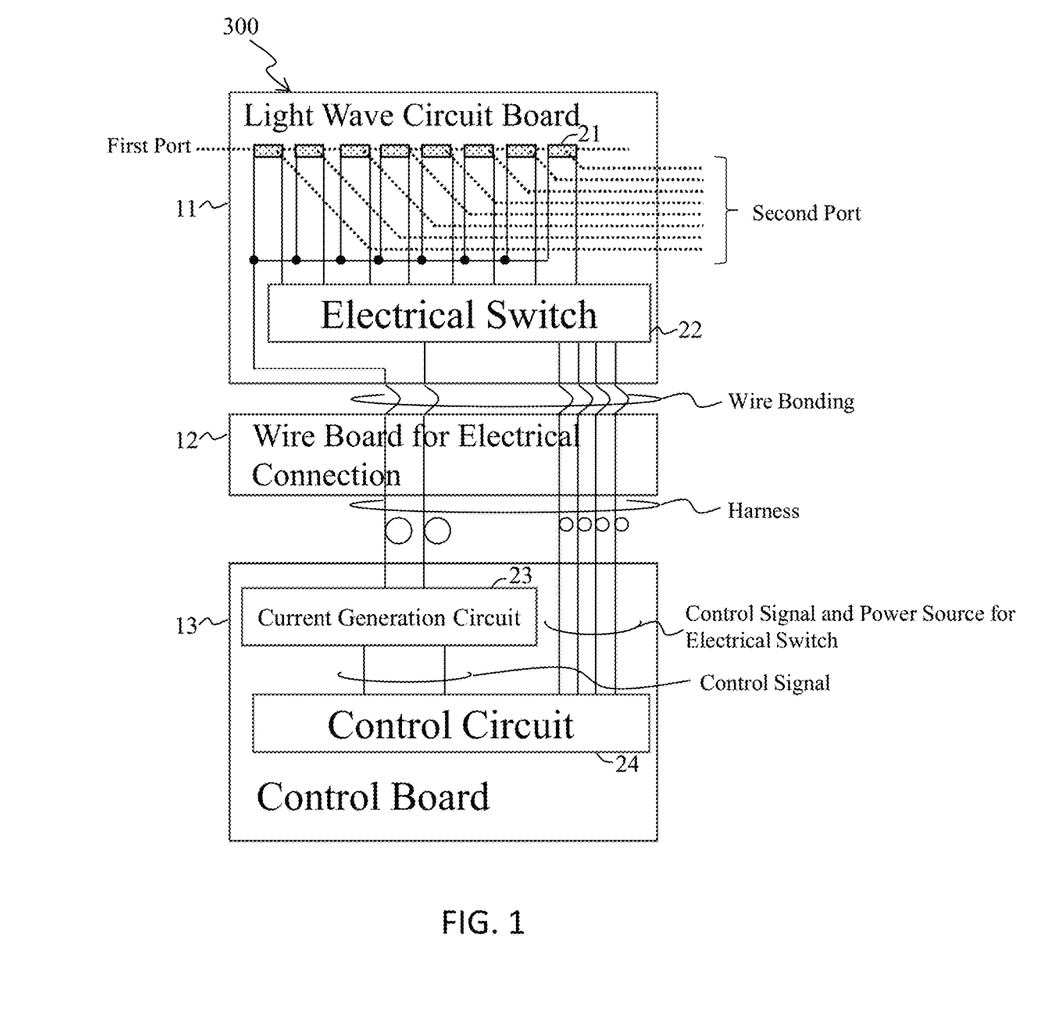
FIG. 1 is a diagram illustrating a configuration of a 1×8 optical switch module to which Patent Literature 1 is applied.

To solve this problem, Patent Literature 1 includes shared electric supply lines for drive power supply circuit on a light wave circuit board to reduce an electrical wire area. FIG. 1 is a diagram schematically illustrating a 1×8 optical switch module to which Patent Literature 1 is applied. Furthermore, mounting driving ICs or controlling ICs as bare chips on a light wave circuit board reduces the number of wire bondings.

CITATION LIST

Patent Literature

Patent Literature 1: JP-A-2004-157332

Here, Patent Literature 1 discloses that it is desirable to use a single layer of gold wires for electrical wires of electronic components mounted on a light wave circuit board (for example, paragraph 0058 of Patent Literature 1). That is, Patent Literature 1 is premised on a single layer of gold wires formed on a board, is not premised on mounting on a multilayer wire board (for example, Printed Circuit Board: PCB), and cannot use commercially available electronic components.

Furthermore, to mount a plurality of electronic components on the light wave circuit board to optimize an electric terminal arrangement of heaters, it is required to develop a dedicated electronic component, for example, an Application Specific Integrated Circuit (ASIC). However, development and manufacturing of an ASIC have had a problem of higher cost compared to a configuration using commercially available electronic components.

Thus, to solve the problem described above, an object of the present disclosure is to provide an optical module that can use commercially available electronic components and has a configuration that can reduce the number of electrical wires.

SUMMARY

To achieve the above-described object, the optical module according to the present disclosure is configured not to directly mount a current generation circuit or an electrical switch on the light wave circuit board but to mount them on a board for an electronic component such as a multilayer wire board.

Specifically, the optical module according to the present disclosure is equipped with:

a light wave circuit board where a plurality of optical switches configured to operate with electric current and input terminals for the respective optical switches to which the electric current is input are formed; a multilayer-wired electric circuit board where an identical number of output terminals to a number of the input terminal of the light wave circuit board and electrical switches that switch the supplied current to any of the output terminals are mounted; and wires that connect the respective output terminals of the electric circuit board and the respective input terminals of the light wave circuit board, wherein the optical switches are divided into one or more groups, and the electrical switches are mounted on the electric circuit board for the number of groups, and the respective electrical switches are shared by the optical switches of the groups.

The optical module includes optical components, such as the optical switch, mounted on the light wave circuit board, and the electronic components mounted on the multilayer wire board, and wire bondings electrically connect them. Thus, the optical module can use the commercially available electronic components. Furthermore, the optical module has a configuration that groups heaters of the optical switches where the current is not simultaneously flowed and supplies the current from the current generation circuit to any of the heaters in the group by one electrical switch. Consequently, the optical module is not required to prepare current generation circuits for the number of the optical switches (heaters).

Therefore, the present disclosure can use the commercially available electronic components and provide the optical module having a configuration that can reduce the numbers of the current generation circuits and the electrical wires.

The electrical switch of the optical module according to the present disclosure is characterized in that the current is supplied from the current generation circuit by a single wire (; hereinafter referred to as a harness) the surface of which is insulated. By using the electrical switch and the current generation circuit with a single harness, the number of wires in this section can be reduced as compared with the case where the present disclosure is not applied, and thus the connection between the boards inside the optical module is effectively facilitated and the space inside the optical module is effectively reduced.

The optical switch of the optical module according to the present disclosure is a 1×2 optical switch and connected in multiple stages like a tree, and the group is constituted of the optical switches disposed at each stage in the multi-stage connection. The optical module can be applied to 1×N optical switch.

ADVANTAGEOUS EFFECTS OF DISCLOSURE

The present disclosure can provide the optical module having a configuration that can use the commercially available electronic components and reduce the numbers of the current generation circuits and the electrical wires.

DETAILED DESCRIPTION OF THE PREFERRED EMBODIMENT

A basic configuration common to each embodiment of the present disclosure will be described by referring to the accompanying drawings. The embodiments described below are working examples of the present disclosure, and the present disclosure is not limited to the embodiments below. Components with the same reference numeral in the specification and the drawings should mutually indicate the same component.

Outline

An optical module of the embodiment includes three boards of a light wave circuit board, a wire board for electrical connection, and a control board, and the former two of the light wave circuit board and the wire board for electrical connection are electrically connected with one another by wire bondings, and the latter two of the wire board for electrical connection and the control board are electrically connected with one another by a harness. The wire board for electrical connection and the control board are electric circuit boards.

The light wave circuit board is a board in which a plurality of optical switches that employ thermooptical effect are formed on a quartz-based light wave circuit (Planar Lightwave Circuit).

The optical switch is a 1×N optical matrix switch in which a plurality of 1×2 optical switches are connected. The 1×2 optical switch as a unit is a Mach-Zehnder Interferometer type (MZI optical switch) equipped with a thermo-optical phase shifter (thin-film heater) in two arm waveguides and can switch a propagation path of light by known interference principle when the thermo-optical phase shifter of the MZI optical switch is energized. The optical switches are divided into one or more groups corresponding to a purpose of an optical module.

The light wave circuit board includes input terminals for supplying electric power to respective heaters for the number of heaters.

The optical switch (thermo-optical switch) using a quartz-based waveguide is manufactured by a combination of a glass film deposition technique, such as a flame hydrolysis deposition method (FHD) or a chemical vapor deposition method (CVD), and a fine processing technique, such as a reactive ion etching method (RIE). Specifically, on a substrate such as a silicon wafer, first, a glass film that becomes a lower clad layer is deposited, and next a core layer that has a slightly higher refractive index than a refractive index of the clad layer is deposited. Then, a core pattern that becomes an optical circuit is patterned by the fine processing technique, subsequently, a glass film that becomes an upper clad layer is deposited, and finally, a thin-film heater that becomes the thermo-optical phase shifter, and the wires and the input terminals to supply electric power to the thin-film heater are formed to manufacture the optical switch. The optical switch module is completed by connecting electrical wires and optical fibers to this optical switch and housing it in a case with heat dissipation fins.

The wire board for electrical connection is a multilayer wire board (such as Printed Circuit Board: PCB) such that commercially available electronic components can be used, on which an electrical switch IC (integrated circuit) that switches the operation of the optical switch of the light wave circuit board is mounted.

The electrical switch mounted on the wire board for electrical connection includes individual electrical switches for the number of optical switches, and the respective individual electrical switches have connecting terminals (output terminals). These output terminals and electrode pads (input terminals) of wire terminals that are connected to the heaters are electrically connected with one another by the wire bondings. The electrical switch and the current generation circuit are electrically connected with one another by a single harness.

The current generation circuit and the control circuit that controls this current generation circuit are mounted on the control board.

One end of the heater of one of the thermo-optical phase shifters (thin-film heater) equipped on two arms of the MZI optical switch is connected to the output terminal of the corresponding individual electrical switch via the input terminal, the wire, and the wire bonding. The other end of the heater is electrically connected to the current generation circuit via the common wire, the wire bonding, and a single harness. With this, the current is supplied only to the heater of the optical switch selected by the electrical switch, and an optical path of the optical switch is switched.

Embodiment 1

Figure 2:
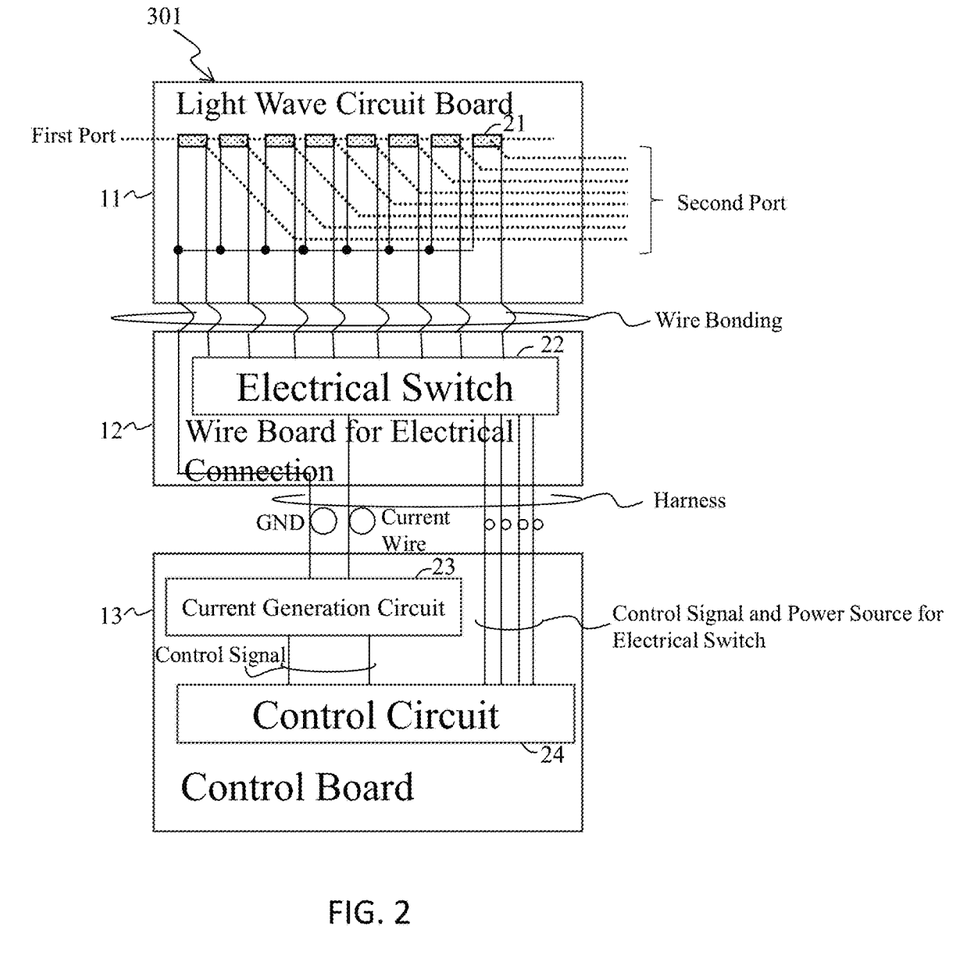
FIG. 2 is a diagram illustrating a configuration of a 1×8 optical switch module as an optical module according to the present disclosure.

FIG. 2 is a diagram illustrating an optical module 301 of the embodiment by taking a configuration of a 1×8 optical switch as an example. The optical module 301 is equipped with a light wave circuit board 11, a wire board for electrical connection 12, and a control board 13. The wire board for electrical connection 12 and the control board 13 are the above-described electric circuit boards.

The light wave circuit board 11 includes 8 1×2 optical switches 21 formed on the quartz-based light wave circuit (Planar Lightwave Circuit), and the 1×2 optical switch 21 uses a Mach-Zehnder Interferometer type optical switch (MZI optical switch) that includes the thermo-optical phase shifter (thin-film heater). The 1×2 optical switch 21 functions as an ON/OFF switch by turning on/off the current to the thin-film heater. When an optical path length difference of the two arm waveguides of the Mach-Zehnder Interferometer is continuously varied from zero to a half wavelength by adjusting a driving amount to the thin-film heater, a transmission amount of light is continuously varied. That is, as the 1×2 optical switch 21 can be operated not only as ON/OFF switch but also as an analog switch, the 1×2 optical switch 21 can also be operated as an attenuator and as a branching unit or the like.

A multilayer printed circuit board (PCB) in which a glass epoxy film and a copper foil are laminated can be used for the wire board for electrical connection 12 and the control board 13. With this, the commercially available electronic components can be mounted on the wire board for electrical connection 12 and the control board 13. According to this configuration, the electrical switch mounted on the light wave circuit board is mounted on the wire board for electrical connection as the PCB compared with the configuration of the 1×8 optical switch according to the embodiment of Patent Literature 1 shown in FIG. 1, and thus ensuring an advantage that the commercially available electronic component can be used.

In this embodiment, all the 1×2 optical switches 21 are set to be one group, and by supplying the current to any of the eight heaters of the 1×2 optical switch 21, the light input in a first port can be output to any one of eight second ports, or any one of the light input in the eight second ports can be selected and output to the first port. In the configuration of this embodiment, as it is only necessary that any of the eight 1×2 optical switches 21 operates, the current does not simultaneously flow into the plurality of heaters, and thus only one current generation circuit 23 is required to flow the current into the 1×2 optical switch 21 in this group. With respect to the 1×2 optical switch 21 grouped as one group, it is only necessary to locate one current generation circuit 23 and one electrical switch 22 corresponding thereto. In the configuration of this embodiment, it is not required to equip current generation circuits 23 and electrical switches 22 for the number of 1×2 optical switches 21. Thus, the board area can be reduced by the decrease of the electronic component.

The electrical switch 22 is integrated with 8 separate individual electrical switches using a digital circuit (for example, TTL IC or the like) and allows the respective individual electrical switches to turn on or off (ON/OFF) operation by input of TTL level from a control circuit. One electrode of the 8 individual electrical switches is connected to a common electrode in the electrical switch 22 and further connected to a harness. The other electrode is connected to respective wire bondings. The number of individual electrical switches integrated inside the electrical switch IC is selected by the number of heaters to be connected. The current generation circuit 23 flows the current corresponding to a voltage level of a control signal from the control circuit to a current line by using an analog circuit.

The embodiment is different from the prior art by Prior Patent 1 in the following points. In the embodiment, the 1×2 optical switch 21 is mounted on the light wave circuit board 11, and the electrical switch 22 is mounted on the wire board for electrical connection 12, which is the multilayer wiring, not on the light wave circuit board 11. Furthermore, the current generation circuit 23 is mounted on the control board 13, which is the multilayer wiring, together with a control circuit 24.

With this, as the general-purpose electrical switch is for the multilayer wire board and an optimum electrical switch can be employed from among various general-purpose products, the product cost can be reduced. Furthermore, while a layout of the electrical switch is restricted by a layout of the light wave circuit when the electrical switch is mounted on the light wave circuit board 11, as a degree of freedom of the layout of the electrical switch increases in mounting on the wire board for electrical connection 12, it is possible to locate the electrical switch at an optimum position with respect to the layout of the 1×2 optical switch in the light wave circuit board 11.

As a PCB in which a glass epoxy film and a copper foil are laminated can be used for the wire board for electrical connection 12, the electrical switch 22 can be constituted of the commercially available electronic components that is premised to be mounted on a multilayer wire board. The light wave circuit board 11 and the wire board for electrical connection 12 are electrically connected with one another by, for example, the wire bonding technique using a gold wire having a length of several millimeters.

The current generation circuit 23 is mounted on the control board 13 where the control circuit 24 is mounted. As the PCB can also be used for the control board, the current generation circuit 23 can be constituted of the commercially available electronic components. The wire board for electrical connection 12 and the control board 13 are connected with one another by a harness the surface of which is insulated. As the electrical switch 22 distributes the current to each 1×2 optical switch 21, the number of harnesses required here for supplying the current may be only the number of electrical switches 22 plus the number of common wires.

An effect of use of the electrical switch is specifically described by using FIG. 2. In a conventional configuration, as the electrical switch corresponding to the 1×2 optical switch of the unit is equipped, the number of harnesses required to supply the current to the electrical switch was eight. Meanwhile, in the optical module 301 of the embodiment, as one electrical switch 22 distribute the current to each 1×2 optical switch 21, the number of harness for supplying the current, which is noted as a current wire in FIG. 2, is reduced to one.

Furthermore, for example, when the current generation circuit 23 determines the current value to be applied to the 1×2 optical switch in accordance with an input voltage value, connection between the control circuit 24 and the current generation circuit 23 is constituted of two wires of the electrical wire and the ground wire that provide the voltage value. In the connection between the control circuit 24 and the electrical switch 22, for example, when the electrical switch 22 switches to which 1×2 optical switch of the eight 1×2 optical switches the current generation circuit is to be connected in accordance with a control signal by an Inter-Integrated Circuit (I2C), three control signal wires of CS, SCLK, and SDI are used. Besides this, a power source of the electrical switch is also supplied from the control circuit, and four wires in total are used.

As the harnesses are mainly used for connecting between the printed circuit boards (PCBs) and have a large diameter of about 1 mm, a space for routing is required. Thus, when the number of harnesses can be reduced, a contribution to downsizing of the module is large. That is, the embodiment has an effect to reduce the number of harnesses and thus facilitates the connection between the boards inside the optical module and has an effect to reduce a space inside the optical module necessary for locating the harnesses.

The arrangement of the control board and the layout of the current generation circuit mounted on the control board are determined from a relationship between the ease of harness connection process and the length of the harnesses. For example, in FIG. 2, while the light wave circuit board, the wire board for electrical connection, and the control board are located in parallel, these arrangement and direction are not specifically limited. The wire board for electrical connection or the wire board for electrical connection and the control board may be located so as to be vertically overlapped with the light wave circuit board, and three boards may be located so as to form three side faces of a triangular prism.

Embodiment 2

Figure 3:
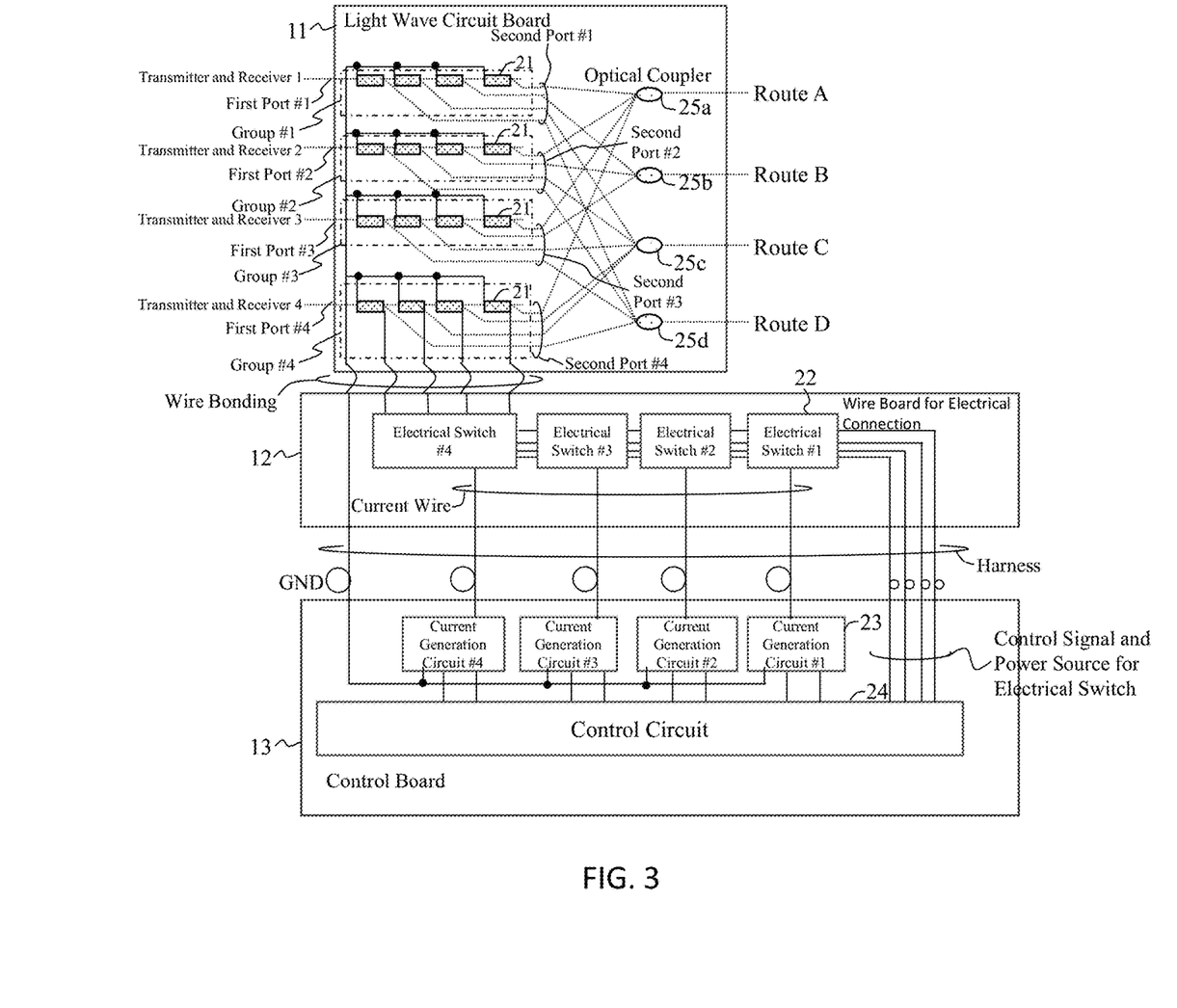
FIG. 3 is a diagram illustrating a configuration of MCS as the optical module according to the present disclosure. Respective wire bondings and wires on a light wave circuit board between groups (#1, #2, #3) and electrical switches (#1, #2, #3) are omitted.

In this embodiment, a Multi Cast Switch (Multi-Cast Switch: MCS) is formed on the light wave circuit board 11. MCS is an optical device that conveniently connects a plurality of routes and a plurality of transmitters and receivers at a relay point of optical communications. FIG. 3 is a diagram illustrating a 4-input 4-output MCS (4×4 MCS). The 4×4 MCS includes 16 1×2 optical switches 21, four 1×4 optical couplers (25a, 25b, 25c, 25d), and an optical waveguide connecting them, which are formed on the light wave circuit board 11.

Here, as illustrated in FIG. 3, the 1×2 optical switches 21 are divided into four groups constituted of 4 1×2 optical switches 21. Typically, in a case of M input×N output MCS, grouping is performed so as to group M 1×2 optical switches of unit connected in series that do not simultaneously turn on. The four 1×2 optical switches 21 in one group are connected in series to constitute a 1×4 optical switch. The respective 1×4 optical switches have one first port that are connected to the respective transmitters and receivers. The respective 1×4 optical switches have four second ports that are each connected to the respective four 1×4 optical couplers (25a, 25b, 25c, 25d). The 1×4 optical coupler has a side, which is not connected to the second port, connected to the route.

The 4×4 MCS is equipped with 4 electrical switches that correspond to the respective groups (1×4 optical switch) and are mounted on the wire board for electrical connection. Between these electrical switches and the control circuit, for example, three control signals and a single power source are connected. When a daisy chain connection technology of Inter-Integrated Circuit (I2C), which is a known communications technology, is applied, three control signals of CS, SCLK, and SDI can be exemplified as the control signal. Between 16 1×2 optical switches 21 constituting the 4×4 MCS and the respective electrical switches, 16 wires (17 wires when including a return current wire) are wire bonded. In FIG. 3, the wires between the respective MCSs of the groups (#1 to #3) and the corresponding electrical switches (#1 to #3) are omitted. The respective electrical switches and the current generation circuits corresponding thereto are connected with one another by four harnesses (five harnesses including the return current wire). Meanwhile, the number of wires required in the conventional configuration, where the 1×2 optical switch and the electrical switch have a 1:1 correspondence, is 16, and 17 when the return current wire is included. That is, the 4×4 MCS configured in FIG. 3 can reduce the number of harnesses from the conventional configuration that does not use the electrical switch.

Figure 4:
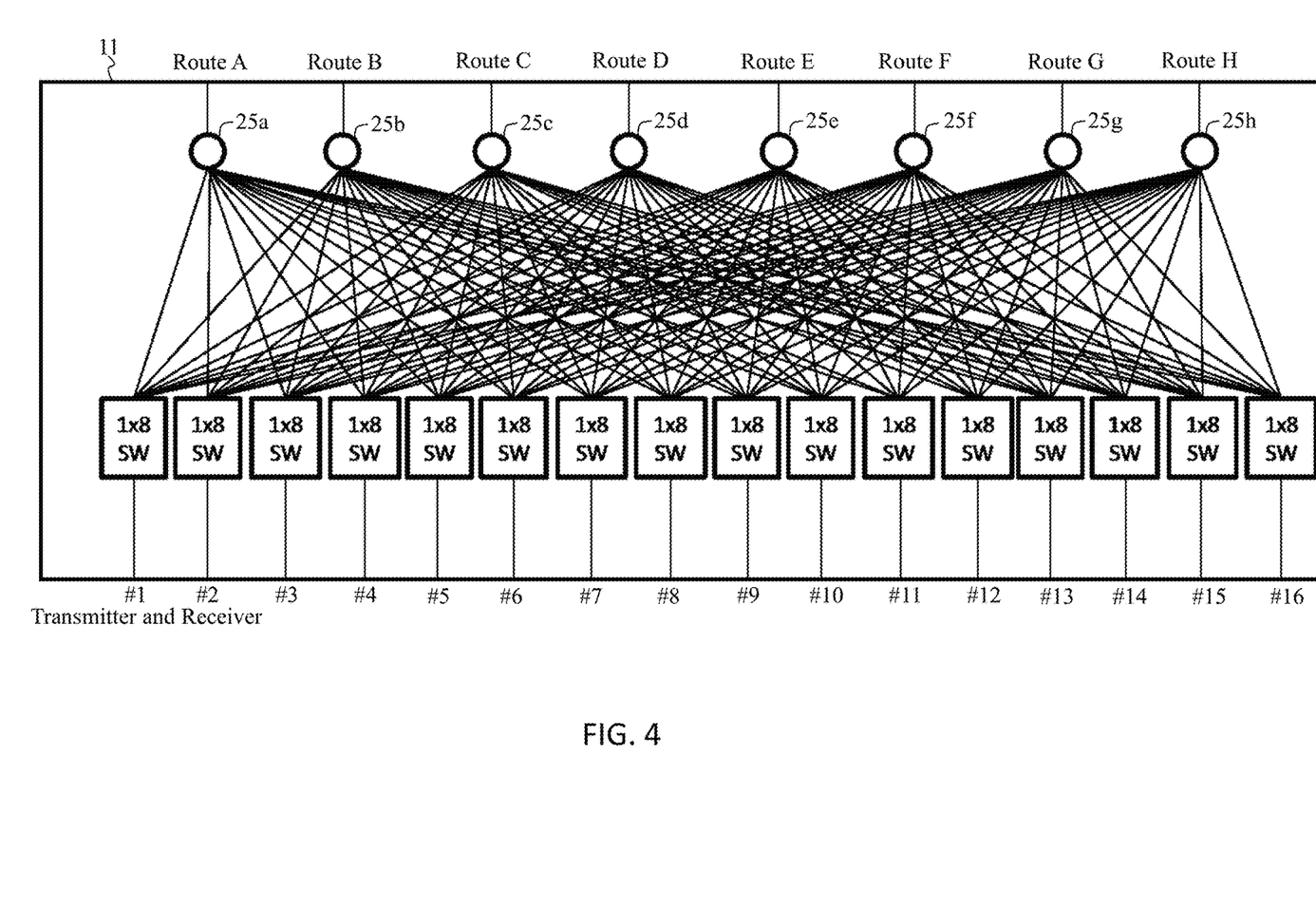
FIG. 4 is a diagram illustrating a configuration of an 8×16 optical switch module as an optical module according to the present disclosure.

FIG. 4 is a diagram illustrating a 16-input 8-output MCS (8×16 MCS). The 8×16 MCS includes 16 1×8 optical switches of the optical module 301 described in the embodiment 1, eight 1×16 optical couplers (25a to 25h), and optical waveguides combining them formed on the light wave circuit board 11. In FIG. 4, description of the wire board for electrical connection and the control board are omitted.

Here, the number of harnesses is compared with the prior art that does not use the electrical switch by taking the 8×16 MCS as an example. As illustrated in FIG. 2, the 1×8 optical switch is constituted by connecting eight 1×2 optical switches 21 in series. Then, 16 1×8 optical switches are formed. Thus, the 8×16 MCS is equipped with 16 electrical switches on the wire board for electrical connection. As the 1×2 optical switches 21 (eight each) included in the 1×8 optical switch (16 pieces) are connected to one electrical switch, the number of wires is 16×8=128 (144 wires when including the return current wire). There can be 16 harnesses (32 harnesses when including the return current wire) between the electrical switches and the current generation circuits. Meanwhile, in the case of the conventional configuration that requires current generation circuits for the number of 1×2 optical switches, as for the number of harnesses, 128 wires corresponding to the 1×2 optical switches 21 are required for drive current. That is, when the configuration of the present disclosure is applied, 16 harnesses are sufficient, and the number of the harnesses can be reduced to about ⅛ of that of the conventional configuration.

Compared with Patent Literature 1 that uses the electrical switch similarly to the optical module of the embodiment, as the electrical switches and the current generation circuits are mounted on the electric circuit board (12, 13), not on the light wave circuit board 11, both the 4×4 MCS in FIG. 3 and the 8×16 MCS in FIG. 4 can use the commercially available electronic components and thus can be constituted at low cost.

Embodiment 3

Figure 5:
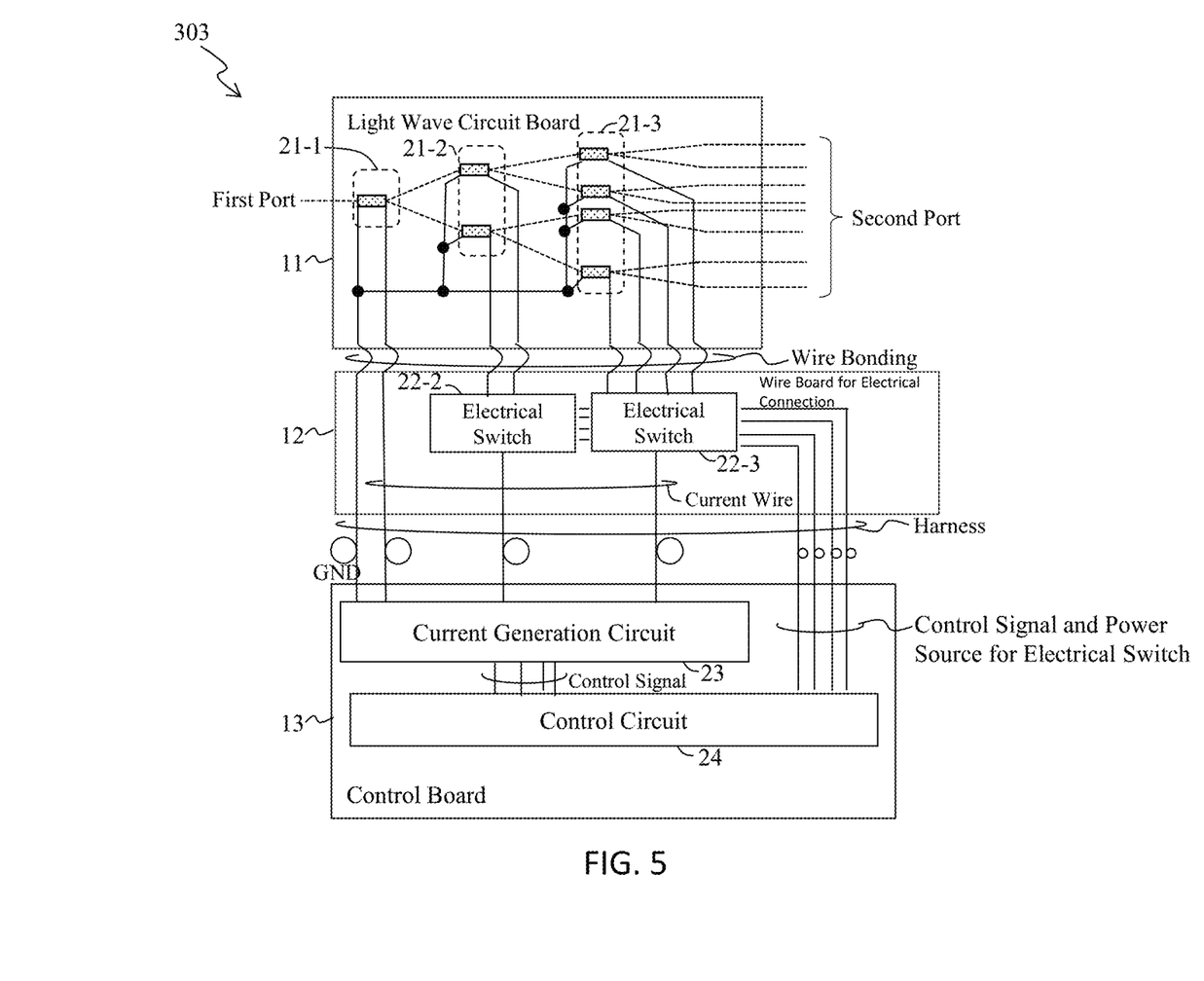
FIG. 5 is a diagram illustrating a configuration of a 1×8 optical switch module as an optical module according to the present disclosure.

FIG. 5 is a diagram illustrating an optical module 303 of this embodiment. The light wave circuit of the optical module 303 has a configuration in which the 1×2 optical switches are connected in multiple stages like a tree, and the optical switches in the same stage of the multi-stage connection are grouped. In this diagram, the number of wires of the control signal and the power source that connect respective electrical switches and the control circuit is 4, similarly to the embodiment 2. The block shown by the current generation circuit includes three current generation circuits similar to the current generation circuit shown in FIG. 3, respective outputs are connected to three current wires, and respective grounds are connected to a common ground (GND) wire. The control signals that determine the current values are wired to the respective current generation circuits from the control circuit. This configuration allows a matrix-shaped arrangement of the 1×2 optical switches of the unit and thus further downsizing of the board compared with the embodiment 1 in FIG. 2.

The light wave circuit of the optical module 303 is a 1×8 switch in a tree configuration where the 1×2 optical switches are connected in three stages. The light wave circuit of the embodiment includes a first-stage 1×2 optical switch 21-1 that branches one first port into two routes, second-stage 1×2 optical switches 21-2 that branch into four routes, and finally third-stage 1×2 optical switches 21-3 that branch into eight second ports.

In the configuration of this light wave circuit, a switch operation that output the light input in the first port to any one of eight second ports, or a switch operation that selects any one of the light input in the eight second ports to output to the first port is performed. To perform this operation, it is only necessary to supply the current to the 1×2 optical switch 21-1 of the first-stage, one of the two 1×2 optical switches 21-2 of the second stage, and one of the four 1×2 optical switches 21-3 of the third stage. That is, as the 1×2 optical switches of the unit included in each stage are not simultaneously turned on, the respective optical switches of the second stage and the respective optical switches of the third stage can be grouped, and it is only necessary that one optical switch is equipped for each of the two groups, which are grouped.

The optical module 303 is equipped with an electrical switch 22-2 for the optical switch group of the second stage and an electrical switch 22-3 for the optical switch group of the third stage. As the optical switch of the first stage has only one 1×2 optical switch 21-1, and thus the electrical switch is not required.

The number of harnesses (current wires) for supplying the current to respective groups from the current generation circuit 23 is three, which is equal to the number of stages. In FIG. 5, as the harness (GND) for the current returning from the 1×2 optical switches is also described, the number of harnesses between the wire board for electrical connection 12 and the control board 13 is four. Meanwhile, in the case of the conventional configuration where the electrical switch is not used and the same number of electrical wires as the number of the optical switches are required between the 1×2 optical switches and the current generation circuits, the number of wires connecting the current generation circuits and the optical switches with one another is eight. That is, the optical module 303 can reduce the number of wires compared with the conventional configuration.

This reduction effect increases as the number of stages of the optical switch increases. For example, in the case of a 1×128 optical switch constituted by a seven-stage tree, 127 wires required for current supply can be reduced to seven wires.

Figure 6:
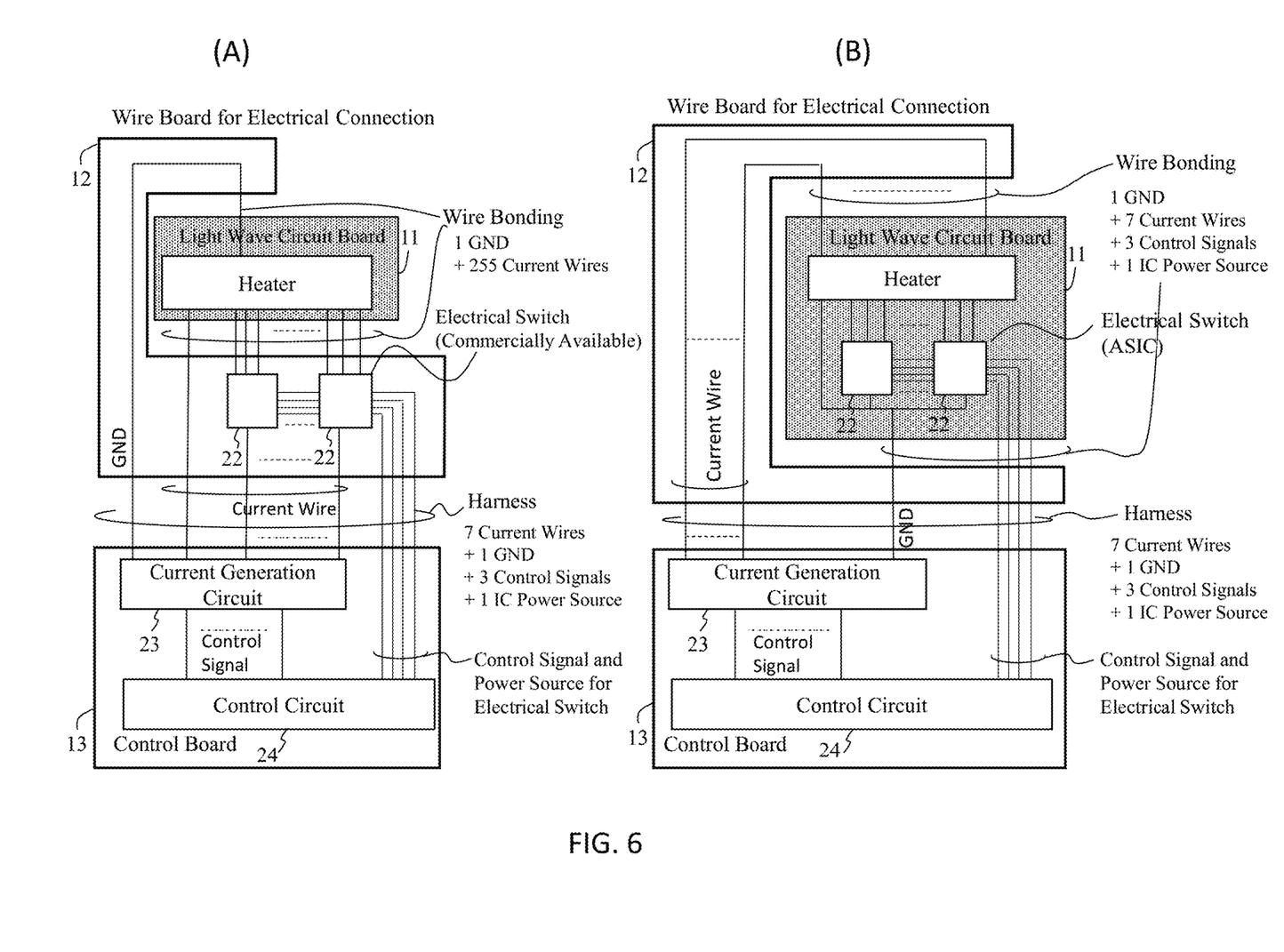
FIG. 6(A) is a diagram illustrating a 1×128 optical switch to which the present disclosure is applied.
FIG. 6(B) is a diagram illustrating a 1×128 optical switch to which Patent Literature 1 is applied.

FIG. 6 is a diagram that schematically illustrates the wires where the technique of the present disclosure and Patent Literature 1 are applied for the 1×128 optical switch constituted by a seven-stage tree. FIG. 6(A) is an example to which the technique of the present disclosure is applied. FIG. 6(B) is an example to which the technique of Patent Literature 1 is applied. In these diagrams, in the block shown by the current generation circuit, seven current generation circuits similar to the current generation circuit shown in FIG. 3 are included, and the respective outputs are connected to the seven current wires and the respective grounds are connected to the common ground (GND) wire. The control signals that determine the current value are wired to the respective current generation circuits from the control circuit. When comparing both of them, the number of harnesses electrically connecting between the current generation circuit and the wire board is seven for the current wire, one for GND, and the same number for the wires of the control signals and the power source to the electrical switches, and is the same in total for both examples. That is, both examples have an effect of reducing the number of wires of the harness and downsizing the optical module. In these diagrams, as the control signal to the electrical switch, in FIG. 6(A), three control signals of CS, SCLK, and SDI can be exemplified when a daisy chain connection technique of an Inter-Integrated Circuit (I2C), which is a known communications technique, is applied. As the control signal in FIG. 6(B), according to the description in FIG. 14 of Patent Literature 1, three control signals of data, a clock, and a latch can be exemplified.

Meanwhile, the number of wire bonding wires (wire bonding) electrically connecting between the wire board and the light wave circuit board is larger in the optical module (256 wires) to which the present disclosure is applied than that in the optical module (12 wires) to which Patent Literature 1 is applied. Thus, the optical module to which Patent Literature 1 is applied has smaller occupation areas of pads for the electrical wires and wire bondings on the light wave circuit board. However, the present disclosure has the electrical switches mounted on the wire board that is a multilayer wire board, and thus can apply a commercially available integrated circuit to manufacture at low cost. When it is required to provide many types of optical modules at low cost and in a short design and manufacturing period, this provides larger advantage compared with the effect obtained by locating dedicated integrated circuits on the light wave circuit board to reduce the wiring area using Patent Literature 1.

Effects of Disclosure

The optical module according to the present disclosure can use low-price commercially available electronic components by mounting the electrical switch on the wire board for electrical connection, the cost of which can be reduced compared with the optical module of Patent Literature 1, and the number of wires can be reduced compared with the configuration to which the present disclosure is not applied.

REFERENCE SIGNS LIST

11 Light wave circuit board
12 Wire board for electrical connection (electric circuit board)
13 Control board
21, 21-1, 21-2, 21-3 1×2 optical switch
22, 22-2, 22-3 Electrical switch
23 Current generation circuit
24 Control circuit
25, 25a to 25h Optical coupler
300, 301, 303 Optical module

What is claimed is:
1. An optical module comprising:
a light wave circuit board on which a plurality of optical switches equipped with a heater, an electrical wire connecting to the heater, an optical waveguide connecting to the optical switch, and an input and output terminal connecting to the optical waveguide are formed;
a wire board for electrical connection on which an electrical switch that selects the optical switch formed on the light wave circuit board to supply an electric power to the heater is mounted;
a control board on which a current generation circuit that supplies the electric power and a control circuit that controls the current generation circuit are mounted; and
respective wires that connect between the current generation circuit on the control board and the electrical switch on the wire board for electrical connection and between the electrical switch on the wire board for electrical connection and an electrical wire connecting to the heater of the optical switch formed on the light wave circuit board, wherein
the optical switches are divided into one or more groups, and
the electrical switch and the group have a 1:1 correspondence, and the electrical switch and the current generation circuit have a 1:1 correspondence.
2. The optical module according to claim 1, wherein
the optical switch is a 1×2 optical switch and is connected in multi stages like a tree, and
the group is constituted by the optical switch in each stage of the tree.

3. The optical module according to claim 1, wherein the wire board for electrical connection is a multilayer wire board.

4. The optical module according to 2, wherein the wire board for electrical connection is a multilayer wire board.

\* \* \* \* \*